United States Patent [19]
Becklund et al.

[11] Patent Number: 5,751,295
[45] Date of Patent: May 12, 1998

[54] GRAPHICS ACCELERATOR CHIP AND METHOD

[75] Inventors: Thomas K. Becklund, Edina; Todd C. Houg, Wyoming; Benton H. Jackson, Maplewood; David O. Sluiter, Scandia; John R. Ukura, Lino Lakes, all of Minn.

[73] Assignee: Control Systems, Inc., St. Paul, Minn.

[21] Appl. No.: 429,834

[22] Filed: Apr. 27, 1995

[51] Int. Cl.$^6$ .................................................. G06F 15/00
[52] U.S. Cl. ........................................... 345/501; 345/516
[58] Field of Search ....................................... 395/162, 166,
395/163, 165, 285, 126, 501, 502, 516,
521; 382/296, 297; 345/501, 502, 516,
521, 526

[56] References Cited

U.S. PATENT DOCUMENTS

| | | | |
|---|---|---|---|
| 4,713,779 | 12/1987 | Graciotti et al. | 395/166 |
| 5,131,080 | 7/1992 | Fredrickson et al. | 395/516 |
| 5,303,334 | 4/1994 | Snyder et al. | 395/162 |
| 5,404,445 | 4/1995 | Matsumoto | 395/162 |
| 5,469,558 | 11/1995 | Lieberman et al. | 395/285 |
| 5,517,626 | 5/1996 | Archer et al. | 395/163 |

OTHER PUBLICATIONS

"Chapter 10 –3GA Enhanced Mode Registers," *Graphics Accelerator* Preliminary Reference Manual.

*Primary Examiner*—Raymond J. Bayerl
*Assistant Examiner*—Cao H. Nguyen
*Attorney, Agent, or Firm*—Merchant, Gould, Smith, Edell, Welter & Schmidt, P.A.

[57] ABSTRACT

A graphics accelerator chip which interprets instructions and data transferred from a microprocessor via an external data bus logically coupled to the microprocessor. A host logic interface buffers the information received from the microprocessor with an on-chip first-in first-out (FIFO) memory which has an address space mapped onto a contiguous sequential address space of the microprocessor. A state machine having a temporary memory receives and interprets instructions and data from the FIFO memory, and routes them to a graphics register set which performs logical graphics operations based upon the graphics instructions and data. The temporary memory stores the last primitive command received, allowing the chip to perform multiple graphics operations where a primitive command is received from the microprocessor only once. A separate data bus from the host logic interface to the graphics register set enables direct access to the graphics registers from the microprocessor.

29 Claims, 8 Drawing Sheets

GRAPHICS ACCELERATOR CHIP AND METHOD

FIELD OF THE INVENTION

The present invention relates to graphics accelerators for use with digital computer systems, and more particularly to a logical component architecture and method of operation for a fast graphics accelerator chip.

BACKGROUND OF THE INVENTION

Designers of computer systems continually strive to increase the performance of their systems through innovative system and semiconductor design. This is particularly true in the field of computer graphics systems, where a large amount of information must typically be processed and displayed to a user on a raster device. Raster devices use a rectangular matrix of individually addressable points called "pixels" which, when turned on or off, are used to display a picture on a standard computer monitor. Even for modest sized displays, the number of pixels can range from the hundreds of thousands to well into the millions.

To manipulate such a large number of pixels, graphics systems designers have developed special purpose graphics processors which are very efficient at drawing figures and moving, rotating, and scaling the image on the computer screen. These graphics processors work in cooperation with a computer system's existing central processing unit (CPU) and can relieve the CPU of many of the tasks it would normally be called upon to do when displaying information on a computer screen to a user. This offloading of some portion of the graphics processing functions from the CPU to a graphics processor can substantially increase the speed with which any particular computer system is able to process graphics information.

However, because the CPU and graphics processor are typically separate components within a computer system, they must communicate with each other through an intermediate data bus. The CPU typically sends information in the form of graphics commands and data to the graphics processor, which in turn interprets the commands and data and performs the appropriate graphics function in response. A graphics command is usually sent across the data bus by the CPU each time a graphics instruction is to be performed, along with the accompanying data for the instruction. If there are a large number of graphics instructions which are being sent from the CPU to the graphics processor, the amount of information sent across the data bus typically causes a bottleneck and slows down the overall performance of the system. Such a bottleneck can be reduced, and overall system speed therefore improved, by finding ways to reduce the amount of information sent across the data bus to the graphics processor by the CPU.

Therefore, there is a need to increase the speed of performing graphics operations in a computer system having a graphics processor by reducing the amount of information sent from the system CPU to the graphics processor. There is a further need to improve the efficiency of the graphics processor in terms of speed and memory usage when performing graphics commands.

SUMMARY OF THE INVENTION

The present invention provides for a graphics accelerator chip which interprets instructions and data transferred from a microprocessor via an external data bus logically coupled to the microprocessor. A host logic interface buffers the information received from the microprocessor with an on-chip first-in first-out (FIFO) random-access memory (RAM) which has an address space mapped onto a contiguous sequential address space of the microprocessor. A state machine having a temporary memory receives and interprets instructions and data from the FIFO RAM, and routes them to a graphics register set which performs logical graphics operations based upon the graphics instructions and data. The temporary memory stores the last primitive command received, allowing the chip to perform multiple graphics operations where a primitive command is received from the microprocessor only once. A separate data bus from the host logic interface to the graphics register set enables direct access to the graphics registers from the microprocessor.

DETAILED DESCRIPTION OF THE PREFERRED EMBODIMENTS

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention. Throughout this specification, reference is made to the 3GA Graphics Accelerator Preliminary Reference Manual, published by Artist Graphics, St. Paul, Minn., which is herein incorporated by reference.

The preferred embodiment of the present invention provides for a graphics accelerator chip which interprets instructions and data transferred from a microprocessor via an external data bus logically coupled to the microprocessor. A host logic interface buffers the information received from the microprocessor with a on-chip FIFO RAM which has an address space mapped onto a contiguous sequential address space of the microprocessor. A temporary memory stores the last primitive command received, allowing the chip to perform multiple graphics operations where a primitive command is received from the microprocessor only once.

Figure 1:
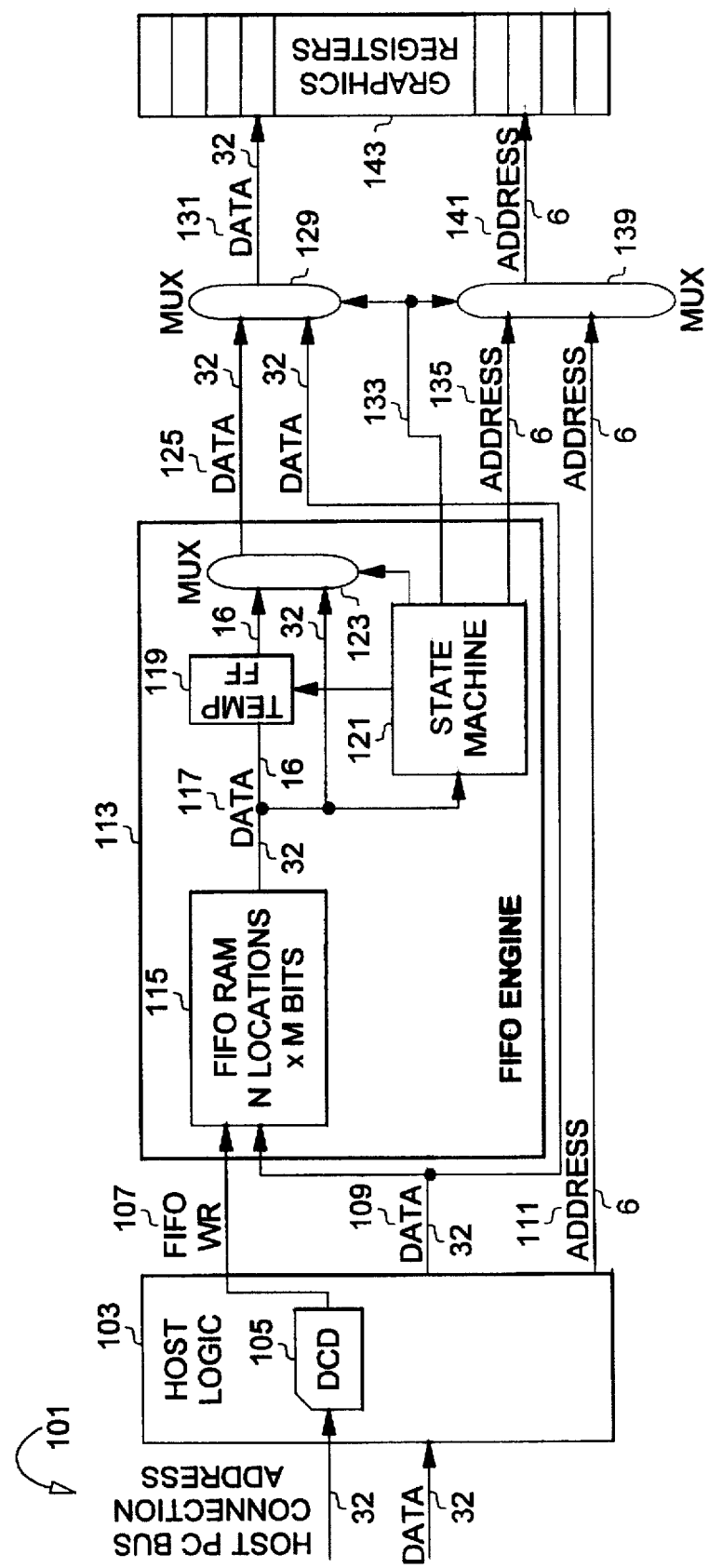
FIG. 1 is a schematic diagram of the logical components of a graphics accelerator chip according to the present invention.

FIG. 1 shows a schematic diagram of the logical components of a preferred graphics accelerator chip. A host logic block 103 provides a portion of the interface to a standard computer data bus. The computer data bus may include such busses as ISA, EISA, VL, PCI, and MCA type busses, but it will be recognized that other data busses may be used with the present invention without loss of generality. For the purposes of this disclosure it will be assumed the host personal computer (PC) bus connection 101 has an address line of 32 bits and a data line of 32 bits, but it will be recognized that other data widths for the address and data lines may be substituted by one of ordinary skill in the art. The host logic block 103 uses a decoder 105 to provide multiple successive address decodes for a FIFO RAM 115, which preferably is mapped into the PC address memory space. Assuming an address line which is 32 bits wide, the number of successive address locations decoded by the decoder 105 ranges from 2 to $2^{32}$.

Having the write port 107 to the FIFO RAM 115 appear at successive PC address locations allows software running on the PC to use fast data transfer commands such as a REP MOV or a BLOCK MOVE command to move data from memory located on the PC to the FIFO RAM 115. When such fast data transfer commands are executed, they are typically executed through a burst transfer mode on the data bus. Burst transfers are normally part of a PC bus specification, and provide higher throughput than normal data transfer modes. Comparing burst transfer rates to non-burst transfer rates shows a significant performance improvement for burst operations. An example is given below in Table 1:

TABLE 1

Comparison of data transfer modes.

| Mode | Data | Speed | Throughput |
|---|---|---|---|
| Non-burst | 4 bytes | 90 ns | 44.44 MBytes/sec |
| Burst | 4 bytes | 60 ns | 66.67 MBytes/sec |

The burst transfer mode as given above shows a 50% performance improvement in the data transfer rate from the host PC microprocessor or memory to the FIFO RAM 115 of the graphics chip. The mapping of the FIFO RAM 115 address space onto successive address locations within PC memory allows the faster data bus burst transfer mode to be used with the present invention.

The PC microprocessor sends a combination of primitive commands and data to the graphics processor of the present invention. A primitive command is a binary pattern specifying a type of graphics operation to be performed by the graphics processor. Examples using hexadecimal values include, 0x82000000—draw a line, and 0x88000000—draw a trapezoid. A primitive command is also known as an operational code or OPCODE. A primitive register is a register located in the graphics processor, which, when written with a primitive command, causes the graphics processor to execute the specified primitive and perform the associated graphics operation.

A FIFO graphics engine 113 is responsible for routing primitive commands and data from the PC microprocessor and memory to the graphics registers 143. The preferred FIFO graphics engine 113 contains the FIFO RAM 115, a temporary storage location 119, a state machine 121, and a multiplexer (MUX) 123. The FIFO RAM 115 provides N storage locations, M bits wide. The temporary storage location 119 is used to hold a primitive command. The temporary storage location 119 is preferably implemented as a transistor flip-flop (FF) M bits wide, but it will be recognized that other implementations may be substituted by one of ordinary skill in the art without loss of generality. The preferred state machine 121 contains the logic to implement a data flow algorithm corresponding to the graphics commands that the graphics processor is able to perform. The MUX 123 allows the routing of data from the output port 117 of the FIFO RAM 115 or the temporary storage location 119 to the graphics registers 143. A MUX 129, controlled by control line 133, is used to route data from the FIFO graphics engine data output 125 or PC data line 109 to the graphics registers 143 via data bus 131. A MUX 139, controlled by control line 133, is used to route address information from the state machine address output 135 or PC address line 111 to the graphics registers 143 via address bus 141.

Prior implementations of graphics processors have, for example, used the following four steps to draw successive disconnected line segments:

1) Write a primitive command to a FIFO RAM;
2) Write a starting point to the FIFO RAM;
3) Write an ending point to the FIFO RAM; and
4) Return to step 1 for the next line segment.

The preferred embodiment of the present graphics processor uses the following four steps to draw successive disconnected line segments:

1) Write a primitive command to a FIFO RAM;
2) Write a starting point to the FIFO RAM;
3) Write an ending point to the FIFO RAM; and
4) Return to step 2 for the next line segment.

It will be noted that with the steps used with the present graphics processor, the primitive command is only sent once. In the case described above for drawing disconnected line segments, this process results in a net reduction of 25% in the number of data transfers from the PC microprocessor or memory to the graphics chip. The set of steps used with the present graphics processor can be generalized as follows:

1) Write a new primitive command to the FIFO RAM;
2) Write the geometry/data required for the primitive command;
3) If the next primitive command is the same as the previous primitive command return to step 2, otherwise return to step 1.

The preferred algorithm implemented in the state machine 121 in the FIFO graphics engine 113 is given below:

| STATE | ACTION |
|---|---|
| IDLE | Is a data word available at FIFO output?<br>No: goto IDLE<br>Yes: goto CHECK |
| CHECK | Is the new data word a primitive command?<br>No: goto CYCLE<br>Yes: goto PRIM |
| PRIM | Capture new primitive in Temp FF and goto CYCLE. |
| CYCLE | Is a data word available at FIFO output?<br>No: goto CYCLE<br>Yes: generate register address for data word<br>    Write data word to GRAPHICS REGISTER.<br>    done?<br>        No: goto CYCLE<br>        Yes: goto PRIM_WR |
| PRIM_WR | Generate PRIMITIVE REGISTER address for data word.<br>Write Temp FF (the primitive) to PRIMITIVE REGISTER.<br>Goto IDLE. |

The preferred state machine algorithm given above enables software running on the PC to only send the primitive command when necessary.

Many graphics chips have a section of logic dedicated to computing the values required by graphics engines. Typical operations include line drawing and bit-block-transfers, commonly called BIT BLTS. BIT BLTS are typically used for scrolling and text drawing operations, among other uses.

The preferred graphics processor of the present invention uses the BIT BLT feature to provide a draw string function for drawing text that requires very little data be sent over the host PC bus to the graphics processor. A normal BIT BLT operation copies pixels in a rectangular fashion from one location in memory to another location, and requires as inputs the coordinates of a source point and the coordinates of a destination rectangle. As shown by bitmap A 301 in FIG. 3, the destination rectangle 303 is preferably specified by Y0X0 and Y1X1, also known as the opposing corners of the BLT. The destination rectangle 303 is tracked by the graphics engine 213 (shown in FIG. 2) as pixels are copied from the source rectangle 307 in bitmap B 305. The source point is specified by Y2X2, which defines the starting point of source pixels in the source rectangle 307.

For a BIT BLT operation, the preferred initialization routine of the present graphics processor computes the following:

PRIM'=PRIMITIVE ( =BIT BLT)
Y0'X0'=Y0X0
DX1=abs (X1-X0)
DY1=abs (Y1-Y0)
Y2'X2'=Y2X0

The computed information given above provides the data necessary for the graphics engine 213 to perform a BIT BLT operation. The initialization routine subsequently asserts GR_ENABLE to start the BIT BLT operation.

Figure 2:
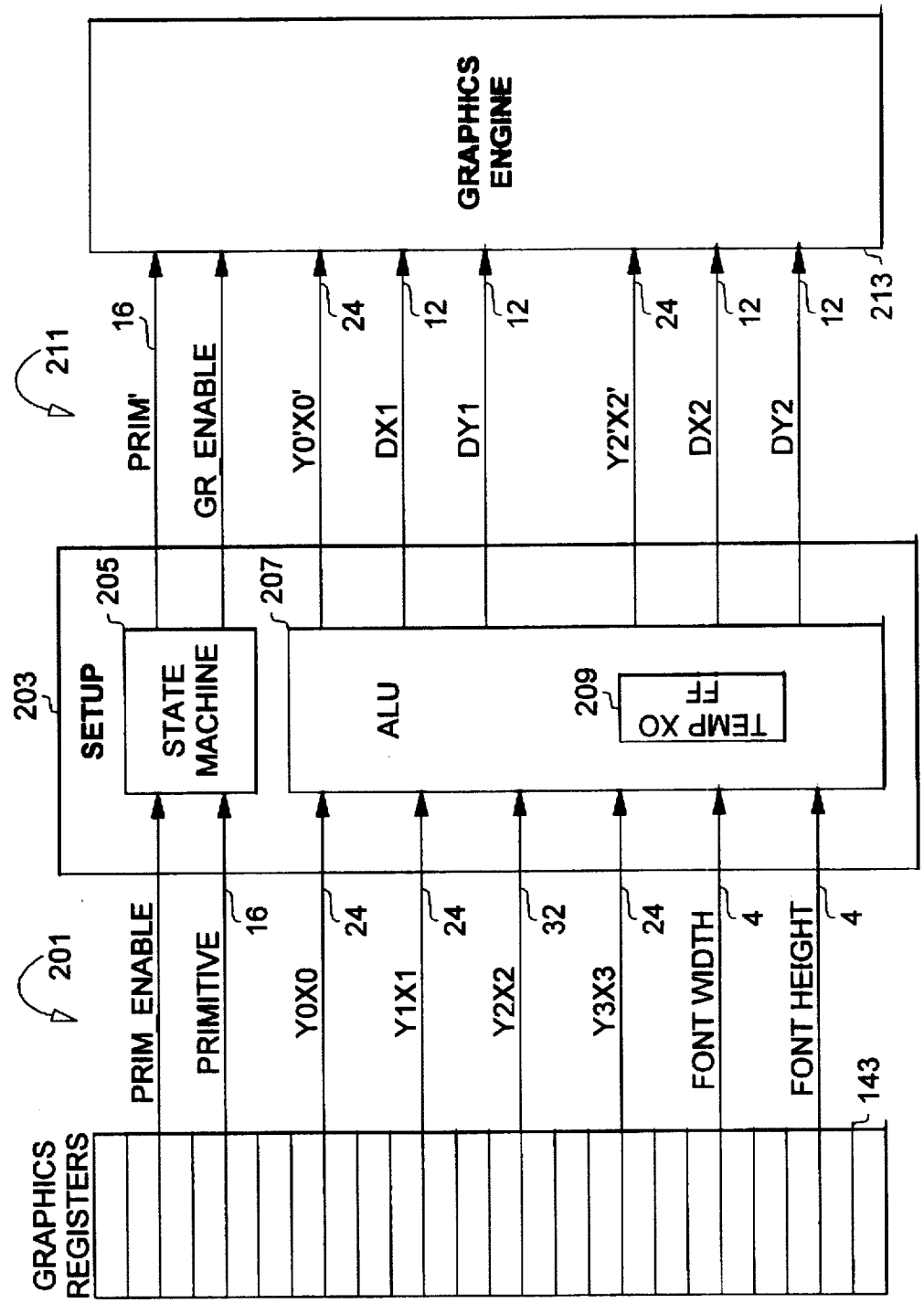
FIG. 2 is a schematic diagram of the logical graphics processing components of a graphics accelerator chip according to the present invention.
Figure 3:
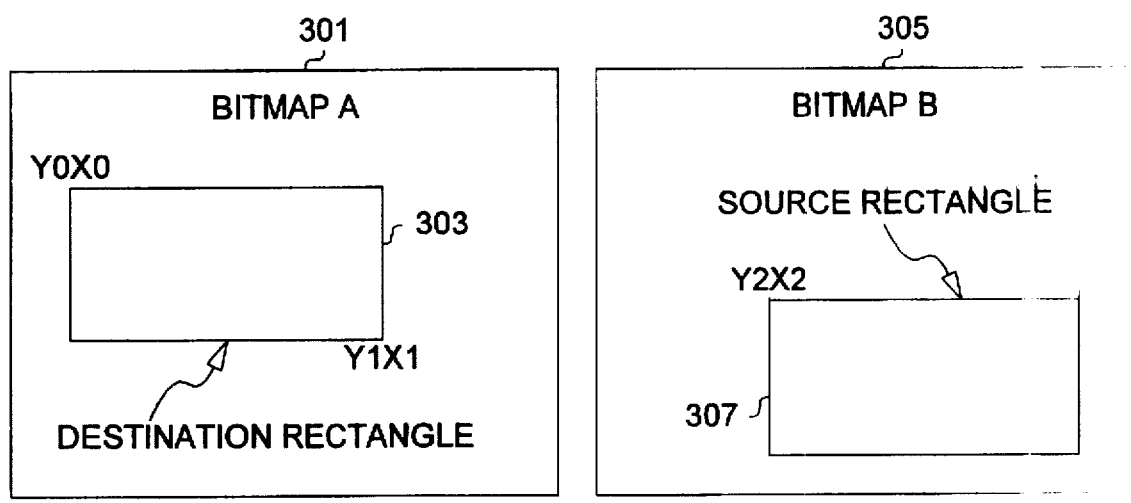
FIG. 3 is a block diagram of the source and destination coordinates for a bit-block-transfer (BIT BLT) according to the present invention.

The hardware drawstring function uses the Y2X2 graphics register shown in FIG. 2. Prior to using the drawstring function, an off-screen memory font bitmap has previously been cached. The font bitmap preferably is a rectangular array of characters, organized in J rows by K columns. The size in pixel coordinates of each cell is defined by the FONTHEIGHT and FONTWIDTH GRAPHICS REGISTERS shown in FIG. 2. The drawstring function preferably defines two character codes in the redefined Y2X2 GRAPHICS REGISTER as follows:

FX1=font table x index for character 1
FY1=font table y index for character 1
DX1=amount to move right after drawing character 1
FX2=font table x index for character 2
FY2=font table y index for character 2
DX2=amount to move right after drawing character 2 or 0XFF if there is only a single character.

The initialization state machine algorithm for the drawstring graphics operation is given below:

| STATE | ACTION |
|---|---|
| IDLE | Is PRIM_ENABLE asserted?<br>No: goto IDLE<br>Yes: goto DECODE |
| DECODE | Is PRIMITIVE == DRAWSTRING?<br>No: goto handle other instructions<br>Yes: goto DRAWSTR1 |
| DRAWSTR1 | Has a DRAWSTRING been done before?<br>No: PRIM'   = PRIMITIVE ( = BIT BLT)<br>    Y0'X0'   = Y0X0<br>    DX1   = abs(X1 - X0)<br>    DY1   = abs(Y1 - Y0)<br>    Y2'   = FY1 * FONTHEIGHT<br>    X2'   = FX1 * FONTWIDTH<br>(label1) assert GR_ENABLE<br>    TempX0 = X0'+ DX1<br>    Is DX2 == 0xFF?<br>        No: is GRAPHICS ENGINE done?<br>            No: keep waiting.<br>            Yes: goto DRAWSTR2<br>        Yes: goto IDLE.<br>Yes: X0'   = TempX0<br>    Y2'   = FY1 * FONTHEIGHT<br>    X2'   = FX1 * FONTWIDTH<br>    goto label1 |
| DRAWSTR2 | X0'   = TempX0<br>Y2'   = FY2 * FONTHEIGHT<br>X2'   = FX2 * FONTWIDTH<br>assert GR_ENABLE<br>TempX0   = X0'+ DX2<br>goto IDLE |

As shown in FIG. 2, the preferred setup component 203 of the graphics processor of the present invention contains a state machine 205, and arithmetic logic unit (ALU) 207, and a temporary register TempXO 209.

To instruct the present graphics processor to perform a drawstring operation, the software running on the PC preferably uses the following five steps:

1) Write a drawstring command to the FIFO RAM 115;
2) Write Y0X0, which is the first opposing destination rectangle point;
3) Write Y1X1, which is the second opposing destination rectangle point;
4) Write a character code value for one or two characters in Y2X2;
5) Return to step 4 until the character string is drawn.

Figure 4:
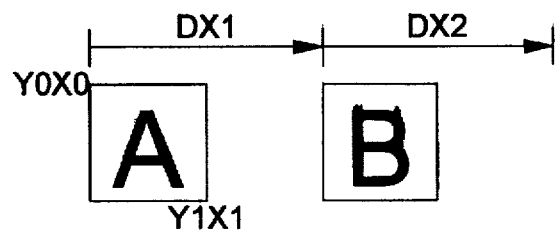
FIG. 4 is a block diagram of a DRAWSTRING graphics operation according to the present invention.

A graphical representation for a two character drawstring is shown in FIG. 4. The drawstring function uses multiple address decode operations to transfer data in burst mode from the PC microprocessor or memory to the FIFO RAM 115. The FIFO ENGINE 113 requires that only Y2X2 information be sent for each two characters to be drawn. The setup state machine 205 then typically processes each of these character codes to draw a horizontal string of characters.

The preferred embodiment of the present invention implements the fields widths of Y2X2 REGISTER as:

| | |
|---|---|
| DX1, DX2 | = 8 bits |
| FY1, FX1, FY2, FX2 | = 4 bits |

The FY1, FX1, FY2, FX2 values preferably realize a 16×16 square of characters with the character cell defined as given below in Table 2:

TABLE 2

Character cell definitions.

| Font Height/Width | Character Cell |
|---|---|
| 0000 | 8 pixels tall/wide |
| 0001 | 12 pixels tall/wide |
| 0010 | 24 pixels tall/wide |
| 0011 | 72 pixels tall/wide |
| 0100 | 16 pixels tall/wide |
| 0101 | 20 pixels tall/wide |
| 0110 | 32 pixels tall/wide |
| 0111 | 80 pixels tall/wide |
| 1000 | 32 pixels tall/wide |
| 1001 | 36 pixels tall/wide |
| 1010 | 48 pixels tall/wide |
| 1011 | 96 pixels tall/wide |
| 1100 | 64 pixels tall/wide |
| 1101 | 68 pixels tall/wide |
| 1110 | 80 pixels tall/wide |
| 1111 | 128 pixels tall/wide |

In order to provide smooth shading and give the appearance of an even graduation of colors on a shaded object, the preferred embodiment of the present invention uses dithering during the Gouraud shading process. Each pixel of a shaded object normally has a coordinate (Y,X) and a color value. The color value is preferably represented in a fixpoint notation such as fpI.fpF, where fpI is the integer portion of the color value and fpF is the fractional part of the color value. The value of fpI is the value that is written to display memory. Both fpI and fpF are preferably maintained internally in the present graphics processor in a storage location. As a shaded object is rendered, the color value for each (Y,X) coordinate is preferably calculated as V +VInc, where both V and VInc are in fpI.fpF format. An example using hexadecimal values is given below:

$$\frac{V = 34.5678 + VInc = 01.ABCD}{V' = 36.0245}$$

In the non-dithered case, the resulting integer value of the ADD operation in the above example (e.g. "36") would be placed in memory. This may produce a visually undesirable effect of banding when drawing at 8 or 16 bits/pixel. Dithering is a technique for introducing "noise" into the above calculation. This noise essentially consists of an additional calculation performed after the ADD operation using the coordinates of the current pixel. The noise value may cause the integer portion of the post ADD value to be incremented (e.g. in the above example, 36 +1=37). Because the calculation is not random but based upon the pixel coordinates and the fractional portion of the color value, it is called an ordered Dither.

The preferred ordered dither algorithm uses the least significant bits of the X and Y coordinates for each pixel to be drawn. In the preferred graphics processor of the present invention, the least significant two bits are used to create a matrix value as given below in Table 3:

TABLE 3

Ordered dither matrix values.

| x[1:0] | y[1:0] | matrix value [3:0] |
|---|---|---|
| 00 | 00 | 0000 |
| 00 | 01 | 1000 |
| 00 | 10 | 0010 |
| 00 | 11 | 1010 |
| 01 | 00 | 1100 |
| 01 | 01 | 0100 |
| 01 | 10 | 1110 |
| 01 | 11 | 0110 |
| 10 | 00 | 0011 |
| 10 | 01 | 1011 |
| 10 | 10 | 0001 |
| 10 | 11 | 1001 |
| 11 | 00 | 1111 |
| 11 | 01 | 0111 |
| 11 | 10 | 1101 |
| 11 | 11 | 0101 |

The matrix value is preferably compared to the fractional portion of the post ADD color value from the interpolator logic. If the matrix value is greater than the post ADD fractional value, the post ADD integer value is incremented as shown below:

| | |
|---|---|
| V' = V + VInc; | // perform primary color ADD for (Y, X) |
| matrix = matrix_function (Y, Y); | // compute matrix value |
| if ( matrix > V' [fpF] ) then | // compare matrix to post add fractional value |
| V' [fpI] = V' [fpI] + 1; | // add noise to integer value else |
| V' [fpI] = V' [fpI]; | // don't add noise to integer value |
| write_pixel (Y, X, V' [fpI]); | // write pixel color value to memory |

This process produces a marked smoothing effect of the shaded image most noticeable at 8 and 16 bits/pixel.

A well-known method of drawing polygons using spans is called an edge coherence algorithm. This is described in *Computer Graphics: Principles and Practice*, 2nd edition, by James D. Foley, Andries van Dam, Steven K. Feiner, and John F. Hughes, 1990, Addison-Wesley, pp. 92–99, which is herein incorporation by reference. An advantage of this algorithm is that all of the pixels in a span can be processed together by the underlying hardware. The present invention provides an improved method by drawing the polygon with trapezoids, which can be easily implemented in hardware.

The preferred polygon drawing method of the present invention draws a convex polygon by breaking it up into trapezoids which have a flat (horizontal) bottom and top, using hardware that draws trapezoids. The method utilizes the slope of the sides of each trapezoid. It will be recognized that this method may be extended by one of ordinary skill in the art to Gouraud shaded (smooth shaded), z-buffered, and texture mapped polygons without loss of generality.

Figure 5:
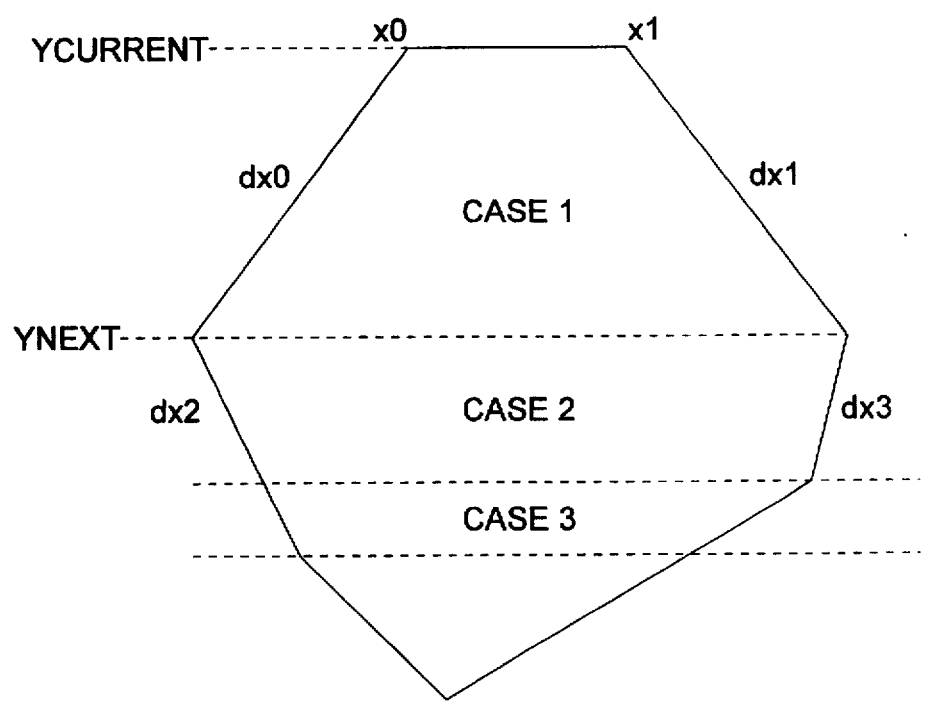
FIG. 5 is a block diagram illustrating a method of drawing a convex polygon with trapezoids according to the present invention.

As shown in FIG. 5., the preferred polygon drawing method of the present invention begins at a topmost vertex (lowest y-value), and checks an array of vertices representing the polygon for a next left and right vertices. Each trapezoid may be divided into one of three cases:1) the left and right vertices are at the same level, 2) the right vertex is higher than the left vertex, or 3) the left vertex is higher than the right vertex. It will be recognized that although the terms "left" and "right" are used in this description, they apply only if the array of vertices is given in a clockwise order. If the polygon is given by an array of vertices in counter-clockwise order, left and right are reversed. It will also be recognized that reversal of the directions of left and right for vertices in counter-clockwise order is not necessary if the underlying hardware implementation of drawing trapezoids is not direction sensitive.

The preferred polygon drawing method of the present invention uses the following hardware functions:

1. Draw_Span (x0, x1, y0). This function draws a horizontal line from (x0, y0) to (x1, y0).
2. Draw_Trap (x0, x1, dx0, dx1, y0, y1). This function draws a trapezoid with flat top and bottom, where "y0" and "y1" are the starting and ending y value, "x0" and "x1" are the starting coordinates for the sides (at "y0"), and "dx0" and "dx1" are the slopes of the sides.
3. Draw_Poly (dx0, dx1, y1). This function draws another trapezoid, continuing after the ending y coordinate of the previous Draw_Trap or Draw_Poly, with new side slopes dx0 and dx1, and new ending y1.

The preferred polygon drawing method of the present invention is given below in pseudo-code:

```
extern draw_span(int x0,int x1, int y1);
extern draw_trap(float x0, float x1,float dx0, float dx1, int y0,int y1);
extern draw_ptrap(float dx0, float dx1, int y1);
// draw_ptrap continues where the last trap/ptrap left off.
void draw_polygon(int x[],int y[],int count)
// fills a convex polygon with 'count' vertices.
{
  int i, j;
  int vert0=0,vert1; // left and right next vertex.
  int ymin=32767;
  int ymax=-32767;
  int first=1;
  int color=1;
  int ycurrent, ynext;
  float x0,x1,dx0,dx1,dx2,dx3,dx[MAXVERTS];
  // these variables look like this:
  //       x0       x1
  //       *————————* ycurrent
  //   dx0 /        \ dx1
  //       *————————* ynext
  //     \dx2      dx3/
  for (i=0;i<count;i++) { // find min and max y
    if (y[i]<ymin) {
      vert0=i;
      ymin=y[i]
    }
    if (y[i]>ymax)
      ymax=y[i];
  }
  if (ymin==ymax) { // it's flat-find width & make a span
    int xmin=32767;
    int xmax=-32767;
    for (i=0;i<count;i++) {
      if (x[i]<xmin)
        xmin=x[i];
      if (x[i]>xmax)
        xmax=x[i]
    }
    draw_span(xmin,xmax,ymin);
    return;
  }
  for (i=0;i<count;i++) { // calculate slopes.
    j=(i+1) % count;
    dx[i]=(x[i]-x[j])/(y[i]-y[j]);
  }
  vert1=vert0; // start at the top.
  ycurrent=y[vert0];
  do { // find next right vert, and keep on if top is flat
    x1=x[vert1]
    dx1=dx[vert1]; // get right slope before bumping vert
```

```
    vert1=(vert1+1)%count;
  } while (y[vert1]==ycurrent); // skip past flat top.
  do { // find next left vert, and keep on if top is flat
    x0=x[vert0]
    vert0—; if (vert0<0) vert0=count-1;
    dx0=dx[vert0]; // get left slope after bumping vert
  } while (y[vert0]==ycurrent);
  while (ycurrent<ymax)
    if (y[vert0]==y[vert1]) { // verts are on same level
      ynext=y[vert0];
      dx3=dx[vert1]; // get right slope before bumping
      vert1= (vert1+1)%count;
      vert0—; if (vert0<0) vert0=count-1;
      dx2=dx[vert0]; // get left slope after bumping
    } else if (y[vert0]<y[vert1]) { // next vert is left
      ynext=y[vert0];
      vert0—; if (vert0<0) vert0=count-1,
      dx2=dx[vert0]; // get left slope after bumping
      dx3=dx1;
    } else { // next vert is on the right.
      ynext=y[vert1];
      dx2=dx0;
      dx3=dx[vert1]; // get right slope before bumping
      vert1= (vert1+1)%count;
    if (first)
      draw_trap(x0+0.5,x1+0.5,dx0,dx1,ycurrent,ynext);
    else
      if (ycurrent != ynext)
        draw_ptrap (dx0,dx1,ynext);
      ycurrent=ynext;
      if (ycurrent<ymax) {
        dx0=dx2;
        dx1=dx3;
      }
    }
}
```

The preferred embodiment of the present graphics processor also implements a method which flips or rotates bitmaps in place within a frame buffer, without using extra memory. It will be recognized that this method may be implemented by one of ordinary skill with any computer processor which can perform raster operations with logical functions. The method is based upon a technique of exchanging the values of two memory locations using three exclusive-or (XOR) logical operations. The truth table for a logical XOR operation is given below in Table 4:

TABLE 4

Exclusive-or (XOR) truth table.

| A | B | A XOR B |
|---|---|---------|
| 0 | 0 | 0 |
| 0 | 1 | 1 |
| 1 | 0 | 1 |
| 1 | 1 | 0 |

For example, to exchange the values of two variables A and B, the following method performs the exchange without using a intermediate storage variable:

Step 1. A=A XOR B.
Contents of A after this step: A XOR B.
Step 2. B=A XOR B
Contents of B after this step: B XOR A XOR B, which simplifies to A.
Step 3. A=A XOR B
Contents of A after this: A XOR B XOR A, which simplifies to B.

Figure 7:
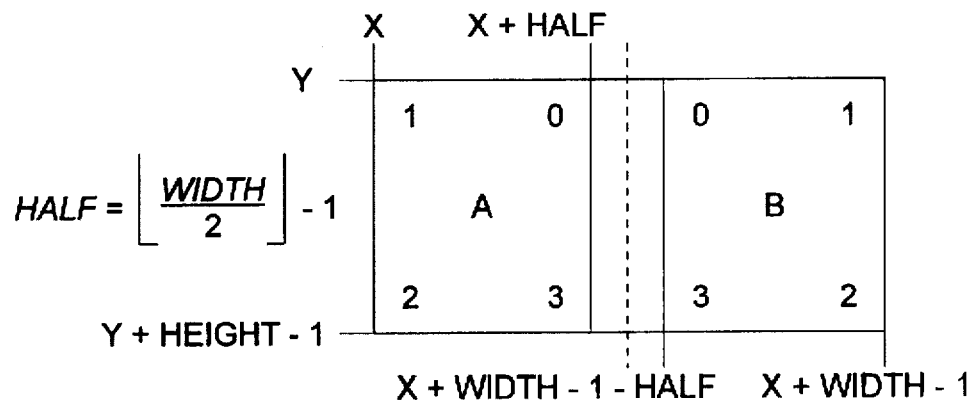
FIG. 7 is a block diagram of a horizontal flip of a pixel area according to the present invention.

As shown in FIG. 7., the preferred horizontal flip method of the present invention first divides a rectangular bitmap which is to be flipped into two areas A and B. FIG. 7 uses the number 0–3 to designate corners of the areas A and B which line up with each other. Second, B is copied onto A using texture mapping and the XOR logical raster operation, then A is copied onto B using XOR, and finally B is copied onto A again using XOR.

A raster operation is a typical function in many graphics processors which applies a logical combination of source pixel, destination pixel, and a pattern. The XOR raster operation referenced above is applied as: DEST XOR SOURCE. Texture mapping is a further operation that typically copies pixanother arbitrary pol polygon to another arbitrary polygon, distorting the pixels as needed to match the destination polygon. The areas A and B chosen in the method given above must be in one-to-one correspondence to ensure that pixels are not lost during the flip operation.

Figure 6:
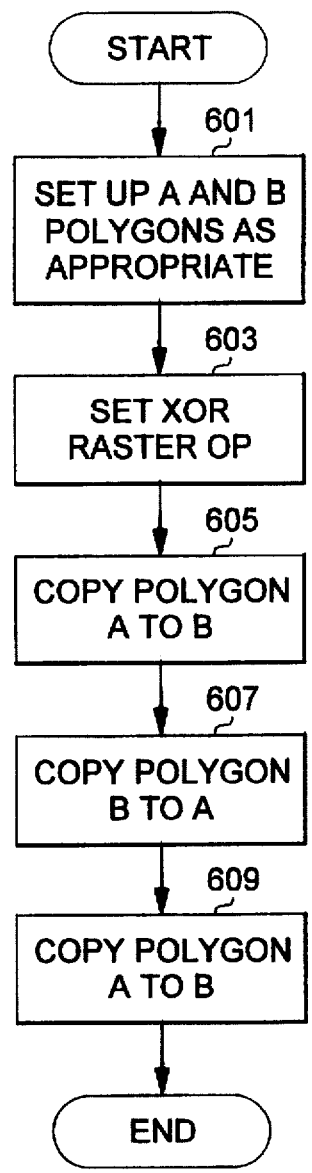
FIG. 6 is a flow diagram of exchanging two pixel areas according to the present invention.

FIG. 6 gives a general program flow of a bitmap flip method of the present invention. At 601, the bitmap is divided into polygons A and B, and at 603 the raster operation is set to XOR. At 605, A is copied to B, at 607 B is copied to A, and at 609 A is copied back to B.

Figure 8:
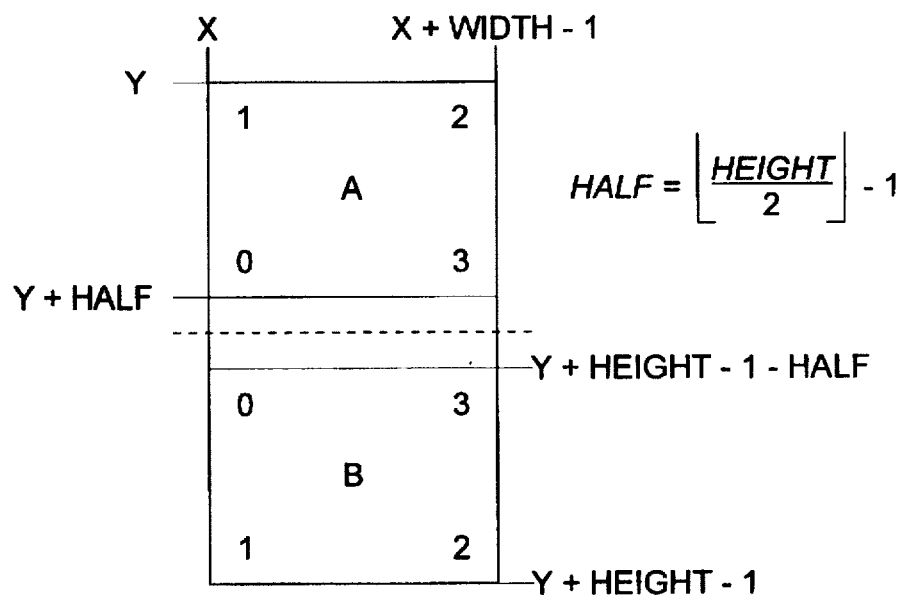
FIG. 8 is a block diagram of a vertical flip of a pixel area according to the present invention.

FIG. 7 shows the rectangles to use for a horizontal flip, and FIG. 8 shows the rectangles for a vertical flip. It will be noted that if the width (or the height, for vertical flip) is odd, there is a column (or row) of pixels that do not need to be moved. The number of pixels that have to be moved with this method is typically 1.5 times the number of pixels in the region, minus the height (or width) if the width (or height) is odd. A traditional method of flipping a bitmap using off-screen memory requires that two times the number of pixels in the bitmap be moved.

Figure 9:
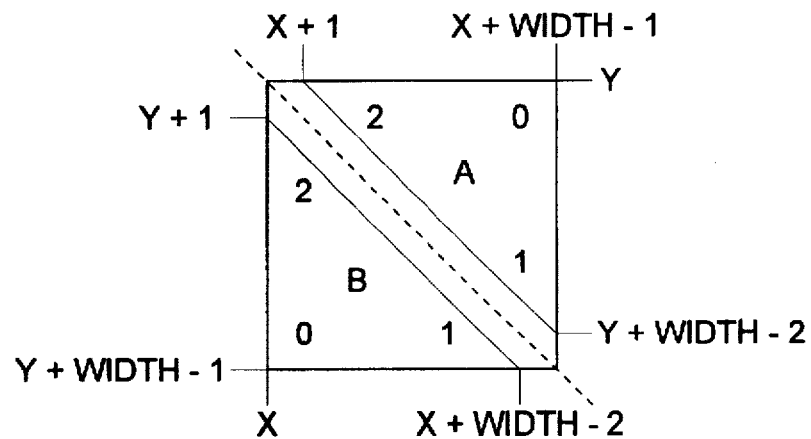
FIG. 9 is a block diagram of a diagonal flip of a pixel area according to the present invention.

A diagonal flip of a bitmap region may be performed with three triangular texture mappings as shown in FIG. 9. It will be noted that the bitmap region is required to be square, and that the pixels on the diagonal do not need to be moved. The number of pixels that have to be moved with this method is typically 1.5 times the number of pixels in the region, minus the width. The traditional method of flipping a bitmap using off-screen memory requires that two times the number of pixels in the bitmap be moved.

Figure 10:
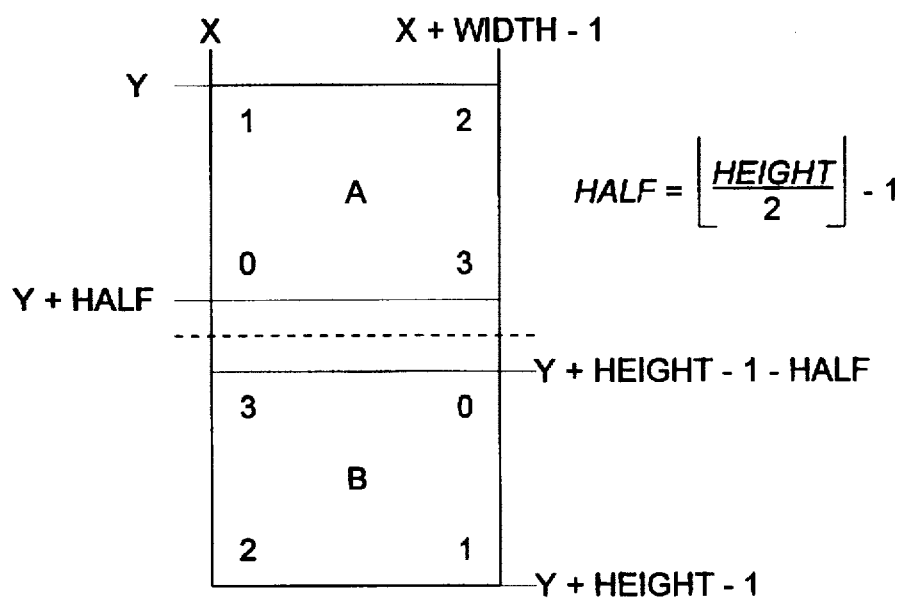
FIG. 10 is a block diagram of a 180° rotation of a pixel area according to the present invention.

A 180° rotation of a bitmap region may be performed in a manner very similar to that of a vertical flip, as shown in FIG. 10. It will be noted that the order of the vertices of the corners of areas A and B is different from that shown in FIG. 8 for a vertical flip, and that if the height of the bitmap area is odd, then the middle row of pixels is required to be flipped left to right. As with a vertical flip, the number of pixels that have to be moved with this method is typically 1.5 times the number of pixels in the region.

Figure 11:
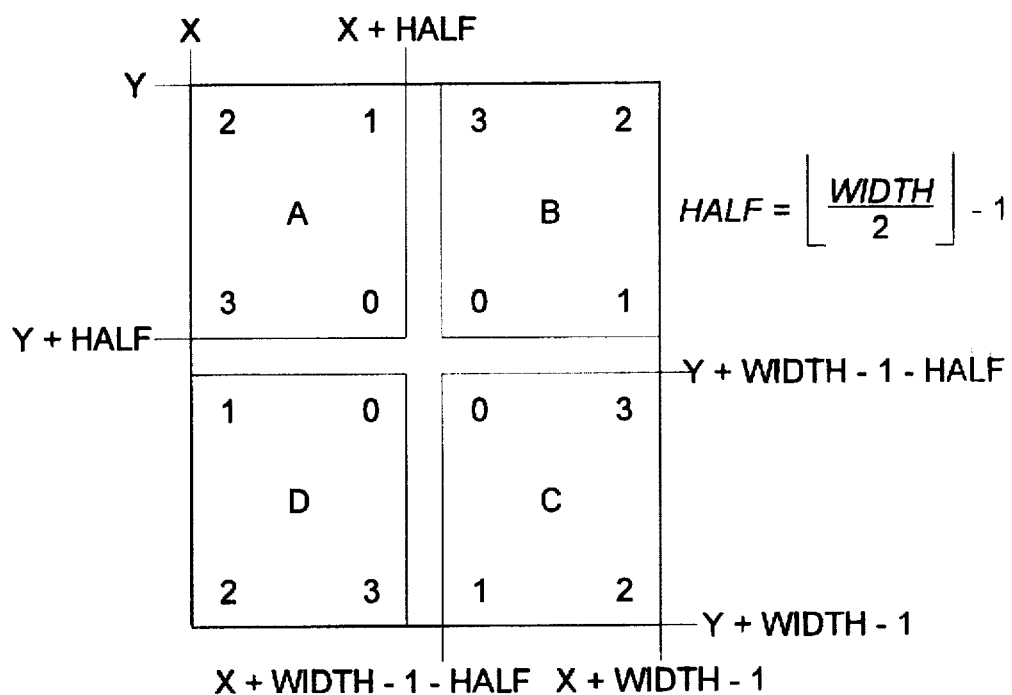
FIG. 11 is a block diagram of a 90° rotation of equal blocks of a pixel area according to the present invention.

A simple way to perform a 90° rotation of a bitmap region is to perform a diagonal flip followed by a horizontal or vertical flip. A 90° right rotation (clockwise) is performed with diagonal flip and then a horizontal flip, and a 90° left rotation (counter clockwise) is performed with a diagonal flip and then a vertical flip. It will be noted that the bitmap region is required to be square. However, this method of rotating moves approximately three times the number of pixels in the region, which is not efficient. An improved way to rotate a region by 90° with the present invention is given in FIG. 11. The bitmap region is divided into four rectangles, which are swapped in pairs using three XOR texture mappings. FIG. 6 shows the polygons used for the method. This preferred requires that approximately 2.25 times the number of pixels be moved, which, while not quite as fast as using off-screen memory, saves the use of off-screen memory without sacrificing much additional time. The swap sequence for a 90° left rotation is swap A and B, then swap B and C, and finally swap C and D. The order is reversed for a right rotation.

Figure 12:
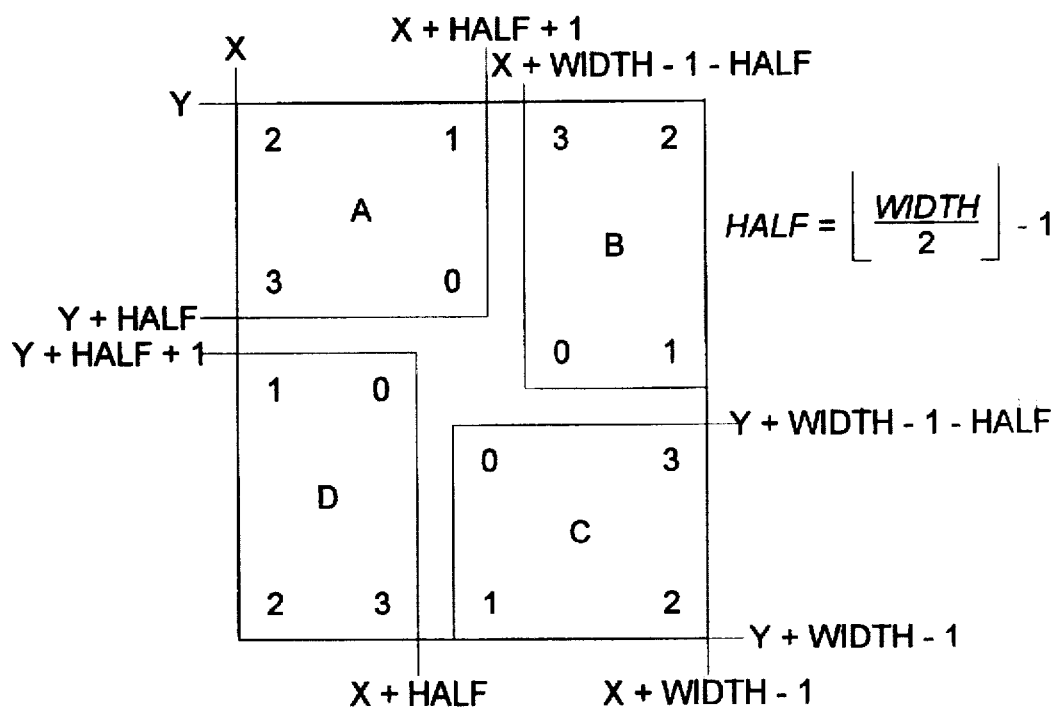
FIG. 12 is a block diagram of a 90° rotation of unequal blocks of a pixel area according to the present invention.

If the width of the region is odd, then an extra column and a row are left over that may be handled by selecting the four areas as shown in FIG. 12. It will be noted that there is one pixel in the middle of the bitmap regions which does not need to be moved.

The present invention is to be limited only in accordance with the scope of the appended claims, since others skilled in the art may devise other embodiments still within the limits of the claims.

What is claimed is:

1. A graphics accelerator chip which interprets instructions and data transferred from a microprocessor via an external data bus logically coupled to the microprocessor, the graphics accelerator chip comprising:

(a) a host logic interface logically coupled to the microprocessor via the external data bus for transferring the instructions and data between the graphics accelerator chip and the microprocessor;

(b) a first-in first-out (FIFO) memory logically coupled to the host logic interface for receiving and buffering the instructions and data, wherein the FIFO memory address space is mapped onto a contiguous sequential address space of the microprocessor;

(c) a state machine logically coupled to the FIFO memory for receiving and interpreting the instructions and data, and performing logical state operations based upon the instructions and data;

(d) a temporary memory logically coupled to the state machine for temporarily storing a graphics instruction while the data associated with that graphics instruction is outputted from the FIFO memory; and (e) a graphics register set logically coupled to the state machine and the temporary memory via a first internal data bus, wherein the graphics register set receives and interprets the graphics instruction and data and performs logical graphics operations based upon the graphics instruction and data.

2. The graphics accelerator chip of claim 1 wherein the temporary memory comprises a flip-flop gate array.

3. The graphics accelerator chip of claim 1 further comprising a second internal data bus logically coupled between the host logic interface and the graphics register set for transferring the instructions and data between the host logic interface and the graphics register set.

4. The graphics accelerator chip of claim 1 wherein the graphics register set comprises a BIT BLT draw function for transferring data from a source location within a display memory logically coupled to the graphics accelerator chip to a destination location within the display memory.

5. A graphics accelerator chip which interprets instructions and data transferred from a microprocessor via an external data bus logically coupled to the microprocessor, the graphics accelerator chip comprising:

(a) receive means for receiving a graphics instruction and for receiving a pixel signal representative of a portion of a display image;

(b) transfer means logically coupled to the receive means for transferring the pixel signal representative of a portion of a display image to a display memory logically coupled to the graphics accelerator chip;

(c) graphics register means logically coupled to the receive means and display memory for interpreting the graphics instruction and for performing a logical graphics operation upon the pixel signal representative of a portion of a display image; and (d) control means logically coupled to the graphics register means for instructing the graphics register means to perform a logical exclusive-or (XOR) copy of the pixel signal representative of a portion of a display image located at a first location within the display memory to a pixel signal representative of a portion of a display image located at a second location within the display memory, perform a logical XOR copy of the pixel signal representative of a portion of a display image located at the second location within the display memory to the pixel signal representative of a portion of a display image located at the first location within the display memory, and perform a logical XOR copy of the pixel signal representative of a portion of a display image located at the first location within the display memory to the pixel signal representative of a portion of a display image located at the second location within the display memory;

wherein the pixel signal representative of a portion of a display image located at the first location within the display memory is exchanged with the pixel signal representative of a portion of a display image located at the second location within the display memory.

6. A method of performing a pixel exchange operation with a graphics accelerator chip comprising the steps of:

(a) receiving a graphics instruction and a pixel signal representative of a portion of a display image;

(b) transferring the pixel signal representative of a portion of a display image to a display memory logically coupled to the graphics accelerator chip;

(c) interpreting the graphics instruction and for performing a logical XOR copy of the pixel signal representative of a portion of a display image located at a first location within the display memory to a pixel signal representative of a portion of a display image located at a second location within the display memory;

(d) performing a logical XOR copy of the pixel signal representative of a portion of a display image located at the second location within the display memory to the pixel signal representative of a portion of a display image located at the first location within the display memory; and (e) performing a logical XOR copy of the pixel signal representative of a portion of a display image located at the first location within the display memory to the pixel signal representative of a portion of a display image located at the second location within the display memory;

wherein the pixel signal representative of a portion of a display image located at the first location within the display memory is exchanged with the pixel signal representative of a portion of a display image located at the second location within the display memory.

7. A method of performing a draw string operation with a graphics accelerator chip using a programmable data processing system having a data input device, a digital data bus capable of transferring information between the data processing system and the graphics accelerator chip, and a display memory, the graphics accelerator chip having a FIFO memory and a temporary memory for storing a primitive command, the method comprising the steps of:

(a) using the data input device to provide the programmable data processing system with a draw string primitive command and multiple data parameters;

(b) using the programmable data processing system to perform the steps of:

(1) initializing a rectangular array of bitmap cells in the display memory, the bitmap cells addressable by cell row and cell column;

(2) transferring the draw string primitive command from the data processing system to the graphics accelerator chip across the digital data bus into the temporary memory;

(3) transferring the multiple data parameters from the data processing system to the graphics accelerator chip across the digital data bus into the FIFO memory, the multiple data parameters including a source point, a destination point, a width value, and a height value;

(4) transferring a cell column value, a cell row value, and a cell width value from the data processing system to the graphics accelerator chip across the digital data bus into the FIFO memory;

(5) using the graphics accelerator chip to transfer pixels from a cell in the display memory corresponding to the cell column value and cell row value stored in FIFO memory to a destination location in the display memory, and move the destination location to the right by the value of the cell width value; and (6) returning to step (4) if there are cell column and row values which have not been transferred from the data processing system to the graphics accelerator chip;

wherein the draw string primitive command is transferred from the data processing system to the graphics accelerator chip only once.

8. The graphics accelerator chip of claim 1 further comprising:

(a) initialization means logically coupled to the graphics register set for initializing a rectangular array of bitmap cells in the display memory, the bitmap cells addressable by cell row and cell column;

(b) receive means logically coupled to the host logic interface, FIFO memory, and temporary memory, for receiving a draw string primitive command and multiple data parameters and storing the draw string primitive command in the temporary memory and the multiple data parameters in the FIFO memory, the multiple data parameters including a source point, a destination point, a width value, a height value, a cell column value, a cell row value, and a cell width value; and (c) transfer means logically coupled to the graphics register set for transferring pixels from a cell in the display memory corresponding to the cell column value and cell row value stored in FIFO memory to a destination location in the display memory, and for moving the destination location to the right by the value of the cell width value.

9. A method of performing an ordered dither operation with a graphics accelerator chip using a programmable data processing system having a data input device, a digital data bus capable of transferring information between the data processing system and the graphics accelerator chip, and a display memory, the graphics accelerator chip having a FIFO memory and a temporary memory for storing a primitive command, the method comprising the steps of:

(a) using the data input device to provide the programmable data processing system with a dither primitive command and multiple data parameters;

(b) using the programmable data processing system to perform the steps of:

(1) initializing a table of matrix values;

(2) transferring the dither primitive command from the data processing system to the graphics accelerator chip across the digital data bus into the temporary memory;

(3) transferring the multiple data parameters from the data processing system to the graphics accelerator chip across the digital data bus into the FIFO memory, the multiple data parameters including a source point, a width value, and a height value;

(4) performing a primary color addition operation to the color value of a pixel in the display memory located at (X,Y), the color value comprising an integer portion and a fractional portion;

(5) computing a matrix value using the (X,Y) location as an index into the table of matrix values;

(6) using the graphics accelerator chip to compare the matrix value to the fractional portion of the color value; and (7) if the matrix value is greater than the fractional portion of the color value, using the graphics accelerator chip to increment the integer portion of the color value;

wherein the incrementing of the integer portion of the color value based upon the matrix value results in smooth shading.

10. The graphics accelerator chip of claim 1 further comprising:

(a) initialization means logically coupled to the graphics register set for initializing a table of matrix values;

(b) receive means logically coupled to the host logic interface, FIFO memory, and temporary memory, for receiving a dither primitive command and multiple data parameters and storing the dither primitive command in the temporary memory and the multiple data parameters in the FIFO memory, the multiple data parameters including a source point, a width value, and a height value;

(c) compute means logically coupled to the graphics register set for performing a primary color addition operation to a color value of a pixel located at (X,Y) in the display memory, and for computing a matrix value using the (X,Y) location as an index into the table of matrix values; and (d) control means logically coupled to the compute means for instructing the compute means to increment an integer portion of the color value of the pixel located at (X,Y) if the matrix value is greater than a fractional portion of the color value.

11. A method of performing multiple graphics operations with a graphics accelerator chip using a programmable data processing system having a data input device and a digital data bus capable of transferring information between the data processing system and the graphics accelerator chip, the graphics accelerator chip having a FIFO memory and a temporary memory for storing a primitive command, the method comprising the steps of:

(a) using the data input device to provide the programmable data processing system with a primitive command and multiple data parameters for each of the multiple graphics operations to be performed;

(b) using the programmable data processing system to perform the steps of:

(1) transferring the primitive command from the data processing system to the graphics accelerator chip across the digital data bus into the temporary memory;

(2) transferring the multiple data parameters corresponding to one of the multiple graphics operations from the data processing system to the graphics accelerator chip across the digital data bus into the FIFO memory;

(3) using the graphics accelerator chip to perform a graphics operation corresponding to the primitive command stored in the temporary memory and multiple data parameters stored in the FIFO memory; and (4) returning to step (2) if there are multiple data parameters which have not been transferred from the data processing system to the graphics accelerator chip;

wherein the primitive command is transferred from the data processing system to the graphics accelerator chip only once.

12. A method of horizontally flipping a rectangular bitmap within a display memory with a graphics accelerator chip using a programmable data processing system having a data input device, a digital data bus capable of transferring information between the data processing system and the graphics accelerator chip, the graphics accelerator chip having a FIFO memory and a temporary memory for storing a primitive command, the method comprising the steps of:

(a) using the data input device to provide the programmable data processing system with a flip primitive command and multiple data parameters;

(b) using the programmable data processing system to perform the steps of:

(1) dividing the rectangular bitmap having a width W and a height H into a left half A and a right half B having equal widths;

(2) transferring the flip primitive command from the data processing system to the graphics accelerator chip across the digital data bus into the temporary memory;

(3) transferring the multiple data parameters from the data processing system to the graphics accelerator chip across the digital data bus into the FIFO memory, the multiple data parameters including a source point, a destination point, a width value, and a height value;

(4) for each pixel in A, using the graphics accelerator chip to perform a logical XOR copy of a pixel in A located at (X,Y) to a pixel in B located at (W-X,Y);

(5) for each pixel in B, using the graphics accelerator chip to perform a logical XOR copy of a pixel in B located at (W-X,Y) to a pixel in A located at (X,Y);

(6) for each pixel in A, using the graphics accelerator chip to perform a logical XOR copy of a pixel in A located at (X,Y) to a pixel in B located at (W-X,Y);

wherein X varies from 0 to int(W/2)-1 and Y varies from 0 to H, and wherein the pixels of A are exchanged with the pixels of B in the display memory.

13. The graphics accelerator chip of claim 1 further comprising:

(a) initialization means logically coupled to the graphics register set for initializing a rectangular bitmap within the display memory, the bitmap having a width W and a height H and being divided into a left half A and a right half B having equal widths;

(b) receive means logically coupled to the host logic interface, FIFO memory, and temporary memory, for receiving a flip primitive command and multiple data parameters and storing the flip primitive command in the temporary memory and the multiple data parameters in the FIFO memory, the multiple data parameters including a source point, a destination point, a width value, and a height value;

(c) transfer means logically coupled to the graphics register set for performing a logical XOR copy of pixels from a source location in the display memory to a destination location in the display memory; and (d) control means logically coupled to the transfer means for instructing the transfer means to perform a logical XOR copy of a pixel in A located at (X,Y) to a pixel in B located at (W-X,Y), perform a logical XOR copy of a pixel in B located at (W-X,Y) to a pixel in A located at (X,Y), and perform a logical XOR copy of a pixel in A located at (X,Y) to a pixel in B located at (W-X,Y), wherein X varies from 0 to int(W/2)−1 and Y varies from 0 to H.

14. A method of vertically flipping a rectangular bitmap within a display memory with a graphics accelerator chip using a programmable data processing system having a data input device, a digital data bus capable of transferring information between the data processing system and the graphics accelerator chip, the graphics accelerator chip having a FIFO memory and a temporary memory for storing a primitive command, the method comprising the steps of:

(a) using the data input device to provide the programmable data processing system with a flip primitive command and multiple data parameters;

(b) using the programmable data processing system to perform the steps of:

(1) dividing the rectangular bitmap having a width W and a height H into an upper half A and a lower half B having equal heights;

(2) transferring the flip primitive command from the data processing system to the graphics accelerator chip across the digital data bus into the temporary memory;

(3) transferring the multiple data parameters from the data processing system to the graphics accelerator chip across the digital data bus into the FIFO memory, the multiple data parameters including a source point, a destination point, a width value, and a height value;

(4) for each pixel in A, using the graphics accelerator chip to perform a logical XOR copy of a pixel in A located at (X,Y) to a pixel in B located at (X,H-Y);

(5) for each pixel in B, using the graphics accelerator chip to perform a logical XOR copy of a pixel in B located at (X,H-Y) to a pixel in A located at (X,Y);

(6) for each pixel in A, using the graphics accelerator chip to perform a logical XOR copy of a pixel in A located at (X,Y) to a pixel in B located at (X,H-Y);

wherein X varies from to W and Y varies from 0 to int(H/2)−1, and wherein the pixels of A are exchanged with the pixels of B in the display memory.

15. The graphics accelerator chip of claim 1 further comprising:

(a) initialization means logically coupled to the graphics register set for initializing a rectangular bitmap within the display memory, the bitmap having a width W and a height H and being divided into an upper half A and a lower half B having equal heights;

(b) receive means logically coupled to the host logic interface, FIFO memory, and temporary memory, for receiving a flip primitive command and multiple data parameters and storing the flip primitive command in the temporary memory and the multiple data parameters in the FIFO memory, the multiple data parameters including a source point, a destination point, a width value, and a height value;

(c) transfer means logically coupled to the graphics register set for performing a logical XOR copy of pixels from a source location in the display memory to a destination location in the display memory; and (d) control means logically coupled to the transfer means for instructing the transfer means to perform a logical XOR copy of a pixel in A located at (X,Y) to a pixel in B located at (X,H-Y), perform a logical XOR copy of a pixel in B located at (X,H-Y) to a pixel in A located at (X,Y), and perform a logical XOR copy of a pixel in A located at (X,Y) to a pixel in B located at (X,H-Y), wherein X varies from 0 to W and Y varies from 0 to int (H/2)−1.

16. A method of diagonally flipping a rectangular bitmap within a display memory with a graphics accelerator chip using a programmable data processing system having a data input device, a digital data bus capable of transferring information between the data processing system and the graphics accelerator chip, the graphics accelerator chip having a FIFO memory and a temporary memory for storing a primitive command, the method comprising the steps of:

(a) using the data input device to provide the programmable data processing system with a flip primitive command and multiple data parameters;

(b) using the programmable data processing system to perform the steps of:

(1) dividing the rectangular bitmap having a width W and a height H into an upper triangle A and a lower triangle B having equal heights and widths;

(2) transferring the flip primitive command from the data processing system to the graphics accelerator chip across the digital data bus into the temporary memory;

(3) transferring the multiple data parameters from the data processing system to the graphics accelerator chip across the digital data bus into the FIFO memory, the multiple data parameters including a source point, a destination point, a width value, and a height value;

(4) for each pixel in A, using the graphics accelerator chip to perform a logical XOR copy of a pixel in A located at (X,Y) to a pixel in B located at (Y,X);

(5) for each pixel in B, using the graphics accelerator chip to perform a logical XOR copy of a pixel in B located at (Y,X) to a pixel in A located at (X,Y);

(6) for each pixel in A, using the graphics accelerator chip to perform a logical XOR copy of a pixel in A located at (X,Y) to a pixel in B located at (Y,X);

wherein X varies from 0 to W, Y varies from 0 to H, X is greater than Y, and wherein the pixels of A are exchanged with the pixels of B in the display memory.

17. The graphics accelerator chip of claim 1 further comprising:

(a) initialization means logically coupled to the graphics register set for initializing a rectangular bitmap within the display memory, the bitmap having a width W and a height H and being divided into an upper triangle A and a lower triangle B having equal heights and widths;

(b) receive means logically coupled to the host logic interface, FIFO memory, and temporary memory, for receiving a flip primitive command and multiple data parameters and storing the flip primitive command in the temporary memory and the multiple data parameters in the FIFO memory, the multiple data parameters including a source point, a destination point, a width value, and a height value;

(c) transfer means logically coupled to the graphics register set for performing a logical XOR copy of pixels from a source location in the display memory to a destination location in the display memory; and (d) control means logically coupled to the transfer means for instructing the transfer means to perform a logical XOR copy of a pixel in A located at (X,Y) to a pixel in B located at (Y,X), perform a logical XOR copy of a pixel in B located at (Y,X) to a pixel in A located at (X,Y), and perform a logical XOR copy of a pixel in A located at (X,Y) to a pixel in B located at (Y,X), wherein X varies from 0 to W, Y varies from 0 to H, and X is greater than Y.

18. A method of rotating a rectangular bitmap by 180° within a display memory with a graphics accelerator chip using a programmable data processing system having a data input device, a digital data bus capable of transferring information between the data processing system and the graphics accelerator chip, the graphics accelerator chip having a FIFO memory and a temporary memory for storing a primitive command, the method comprising the steps of:

(a) using the data input device to provide the programmable data processing system with a rotate primitive command and multiple data parameters;

(b) using the programmable data processing system to perform the steps of:

(1) dividing the rectangular bitmap having a width W and a height H into an upper half A and a lower half B having equal heights;

(2) transferring the rotate primitive command from the data processing system to the graphics accelerator chip across the digital data bus into the temporary memory;

(3) transferring the multiple data parameters from the data processing system to the graphics accelerator chip across the digital data bus into the FIFO memory, the multiple data parameters including a source point, a destination point, a width value, and a height value;

(4) for each pixel in A, using the graphics accelerator chip to perform a logical XOR copy of a pixel in A located at (X,Y) to a pixel in B located at (W-X,H-Y);

(5) for each pixel in B, using the graphics accelerator chip to perform a logical XOR copy of a pixel in B located at (W-X,H-Y) to a pixel in A located at (X,Y);

(6) for each pixel in A, using the graphics accelerator chip to perform a logical XOR copy of a pixel in A located at (X,Y) to a pixel in B located at (W-X,H-Y);

wherein X varies from 0 to W and Y varies from 0 to int(H/2)−1, and wherein the pixels of A are exchanged with the pixels of B in the display memory.

19. The graphics accelerator chip of claim 1 further comprising:

(a) initialization means logically coupled to the graphics register set for initializing a rectangular bitmap within the display memory, the bitmap having a width W and a height H and being divided into an upper half A and a lower half B having equal heights;

(b) receive means logically coupled to the host logic interface, FIFO memory, and temporary memory, for receiving a rotate primitive command and multiple data parameters and storing the rotate primitive command in the temporary memory and the multiple data parameters in the FIFO memory, the multiple data parameters including a source point, a destination point, a width value, and a height value;

(c) transfer means logically coupled to the graphics register set for performing a logical XOR copy of pixels from a source location in the display memory to a destination location in the display memory; and (d) control means logically coupled to the transfer means for instructing the transfer means to perform a logical XOR copy of a pixel in A located at (X,Y) to a pixel in B located at (W-X,H-Y), perform a logical XOR copy of a pixel in B located at (W-X,H-Y) to a pixel in A located at (X,Y), and perform a logical XOR copy of a pixel in A located at (X,Y) to a pixel in B located at (W-X,H-Y), wherein X varies from 0 to W and Y varies from 0 to int (H/2)−1.

20. A method of rotating a rectangular bitmap by 90° within a display memory with a graphics accelerator chip using a programmable data processing system having a data input device, a digital data bus capable of transferring information between the data processing system and the graphics accelerator chip, the graphics accelerator chip having a FIFO memory and a temporary memory for storing a primitive command, the method comprising the steps of:

(a) using the data input device to provide the programmable data processing system with a rotate primitive command and multiple data parameters;

(b) using the programmable data processing system to perform the steps of:

(1) dividing the rectangular bitmap having an even width W and an even height H into an upper left quarter A, an upper right quarter B, a lower right quarter C, and a lower left quarter D having equal heights and widths;

(2) transferring the rotate primitive command from the data processing system to the graphics accelerator chip across the digital data bus into the temporary memory;

(3) transferring the multiple data parameters from the data processing system to the graphics accelerator chip across the digital data bus into the FIFO memory, the multiple data parameters including a source point, a destination point, a width value, and a height value;

(4) for each pixel in A, using the graphics accelerator chip to perform a logical XOR copy of a pixel in A located at (X,Y) to a pixel in B located at (W-Y,X);

(5) for each pixel in B, using the graphics accelerator chip to perform a logical XOR copy of a pixel in B located at (W-Y,X) to a pixel in A located at (X,Y);

(6) for each pixel in A, using the graphics accelerator chip to perform a logical XOR copy of a pixel in A located at (X,Y) to a pixel in B located at (W-Y,X);

(7) for each pixel in B, using the graphics accelerator chip to perform a logical XOR copy of a pixel in B located at (W-Y,X) to a pixel in C located at (W-X, H-Y);

(8) for each pixel in B, using the graphics accelerator chip to perform a logical XOR copy of a pixel in C located at (W-X,H-Y) to a pixel in B located at (W-Y, X);

(9) for each pixel in B, using the graphics accelerator chip to perform a logical XOR copy of a pixel in B located at (W-Y,X) to a pixel in C located at (W-X, H-Y);

(10) for each pixel in C, using the graphics accelerator chip to perform a logical XOR copy of a pixel in C located at (W-X,H-Y) to a pixel in D located at (H-X,Y);

(11) for each pixel in C, using the graphics accelerator chip to perform a logical XOR copy of a pixel in D located at (H-X,Y) to a pixel in C located at (W-X, H-Y);

(12) for each pixel in C, using the graphics accelerator chip to perform a logical XOR copy of a pixel in C located at (W-X,H-Y) to a pixel in D located at (H-X,Y);

wherein X varies from 0 to int(W/2)−1 and Y varies from 0 to int(H/2)−1 , and wherein the pixels of B are exchanged with the pixels of A, the pixels of C are exchanged with the pixels of B, the pixels of D are exchanged with the pixels of C, the pixels of A are exchanged with the pixels of D in the display memory.

21. The graphics accelerator chip of claim 1 further comprising:

(a) initialization means logically coupled to the graphics register set for initializing a rectangular bitmap within the display memory, the bitmap having an even width W and an even height H and being divided into an upper left quarter A, an upper right quarter B, a lower right quarter C, and a lower left quarter D having equal heights and widths;

(b) receive means logically coupled to the host logic interface, FIFO memory, and temporary memory, for receiving a rotate primitive command and multiple data parameters and storing the rotate primitive command in the temporary memory and the multiple data parameters in the FIFO memory, the multiple data parameters including a source point, a destination point, a width value, and a height value;

(c) transfer means logically coupled to the graphics register set for performing a logical XOR copy of pixels from a source location in the display memory to a destination location in the display memory; and (d) control means logically coupled to the transfer means for instructing the transfer means to perform the steps of:

(1) perform a logical XOR copy of a pixel in A located at (X,Y) to a pixel in B located at (W-Y,X), perform a logical XOR copy of a pixel in B located at (W-Y,X) to a pixel in A located at (X,Y), and perform a logical XOR copy of a pixel in A located at (X,Y) to a pixel in B located at (W-Y,X);

(2) perform a logical XOR copy of a pixel in B located at (W-Y,X) to a pixel in C located at (W-X,H-Y), perform a logical XOR copy of a pixel in C located at (W-X,H-Y) to a pixel in B located at (W-Y,X), and perform a logical XOR copy of a pixel in B located at (W-Y,X) to a pixel in C located at (W-X,H-Y);

(3) perform a logical XOR copy of a pixel in C located at (W-X,H-Y) to a pixel in D located at (H-X, Y), perform a logical XOR copy of a pixel in D located at (H-X,Y) to a pixel in C located at (W-X,H-Y), and perform a logical XOR copy of a pixel in C located at (W-X,H-Y) to a pixel in D located at (H-X,Y);

wherein X varies from 0 to int(W/2)−1 and Y varies from 0 to int(H/2)−1.

22. A method of rotating a rectangular bitmap by 90° within a display memory with a graphics accelerator chip using a programmable data processing system having a data input device, a digital data bus capable of transferring information between the data processing system and the graphics accelerator chip, the graphics accelerator chip having a FIFO memory and a temporary memory for storing a primitive command, the method comprising the steps of:

(a) using the data input device to provide the programmable data processing system with a rotate primitive command and multiple data parameters;

(b) using the programmable data processing system to perform the steps of:

(1) dividing the rectangular bitmap having an odd width W and an odd height H into an upper left quarter A, an upper right quarter B, a lower right quarter C, and a lower left quarter D, the width of A and C being equal to the height of B and D and the height of A and C being equal to the width of B and D;

(2) transferring the rotate primitive command from the data processing system to the graphics accelerator chip across the digital data bus into the temporary memory;

(3) transferring the multiple data parameters from the data processing system to the graphics accelerator chip across the digital data bus into the FIFO memory, the multiple data parameters including a source point, a destination point, a width value, and a height value;

(4) for each pixel in A, using the graphics accelerator chip to perform a logical XOR copy of a pixel in A located at (X,Y) to a pixel in B located at (W-Y,X);

(5) for each pixel in B, using the graphics accelerator chip to perform a logical XOR copy of a pixel in B located at (W-Y,X) to a pixel in A located at (X,Y);

(6) for each pixel in A, using the graphics accelerator chip to perform a logical XOR copy of a pixel in A located at (X,Y) to a pixel in B located at (W-Y,X);

(7) for each pixel in B, using the graphics accelerator chip to perform a logical XOR copy of a pixel in B located at (W-Y,X) to a pixel in C located at (W-X, H-Y)

(8) for each pixel in B, using the graphics accelerator chip to perform a logical XOR copy of a pixel in C located at (W-X,H-Y) to a pixel in B located at (W-Y,X);

(9) for each pixel in B, using the graphics accelerator chip to perform a logical XOR copy of a pixel in B located at (W-Y,X) to a pixel in C located at (W-X, H-Y);

(10) for each pixel in C, using the graphics accelerator chip to perform a logical XOR copy of a pixel in C located at (W-X,H-Y) to a pixel in D located at (H-X,Y);

(11) for each pixel in C, using the graphics accelerator chip to perform a logical XOR copy of a pixel in D located at (H-X,Y) to a pixel in C located at (W-X, H-Y);

(12) for each pixel in C; using the graphics accelerator chip to perform a logical XOR copy of a pixel in C located at (W-X,H-Y) to a pixel in D located at (H-X,Y);

wherein X varies from 0 to int(W/2) and Y varies from 0 to int(H/2)−1, and wherein the pixels of B are exchanged with the pixels of A, the pixels of C are exchanged with the pixels of B, the pixels of D are exchanged with the pixels of C, the pixels of A are exchanged with the pixels of D in the display memory.

23. The graphics accelerator chip of claim 1 further comprising:

(a) initialization means logically coupled to the graphics register set for initializing a rectangular bitmap within the display memory, the bitmap having an odd width W and an odd height H and being divided into an upper left quarter A, an upper right quarter B, a lower right quarter C, and a lower left quarter D, the width of A and C being equal to the height of B and D and the height of A and C being equal to the width of B and D;

(b) receive means logically coupled to the host logic interface, FIFO memory, and temporary memory, for receiving a rotate primitive command and multiple data parameters and storing the rotate primitive command in the temporary memory and the multiple data parameters in the FIFO memory, the multiple data parameters including a source point, a destination point, a width value, and a height value;

(c) transfer means logically coupled to the graphics register set for performing a logical XOR copy of pixels from a source location in the display memory to a destination location in the display memory; and (d) control means logically coupled to the transfer means for instructing the transfer means to perform the steps of:

(1) perform a logical XOR copy of a pixel in A located at (X,Y) to a pixel in B located at (W-Y,X), perform a logical XOR copy of a pixel in B located at (W-Y,X) to a pixel in A located at (X,Y), and perform a logical XOR copy of a pixel in A located at (X,Y) to a pixel in B located at (W-Y,X);

(2) perform a logical XOR copy of a pixel in B located at (W-Y,X) to a pixel in C located at (W-X,H-Y), perform a logical XOR copy of a pixel in C located at (W-X,H-Y) to a pixel in B located at (W-Y,X), and perform a logical XOR copy of a pixel in B located at (W-Y,X) to a pixel in C located at (W-X,H-Y);

(3) perform a logical XOR copy of a pixel in C located at (W-X,H-Y) to a pixel in D located at (H-X,Y), perform a logical XOR copy of a pixel in D located at (H-X,Y) to a pixel in C located at (W-X,H-Y), and perform a logical XOR copy of a pixel in C located at (W-X,H-Y) to a pixel in D located at (H-X,Y);

wherein X varies from 0 to int(W/2) and Y varies from 0 to int(H/2)−1.

24. A method of drawing a convex polygon with a graphics accelerator chip using a programmable data processing system having a data input device and a digital data bus capable of transferring information between the data processing system and the graphics accelerator chip, the method comprising the steps of:

(a) using the data input device to provide the programmable data processing system with a vertices list representing the vertices of the polygon;

(b) using the programmable data processing system to perform the steps of:

(1) searching the vertices list to determine a left top vertex and a right top vertex;

(2) setting a current left top vertex equal to the left top vertex and setting a current right top vertex equal to the right top vertex;

(3) searching the vertices list to determine a left bottom vertex and a right bottom vertex below the current left top vertex and the current right top vertex;

(4) determining a first slope between the current left top vertex and the left bottom vertex, and determining a second slope between the current right top vertex and the right bottom vertex;

(5) if the left bottom vertex is at the same height as the right bottom vertex, setting a current bottom height equal to the height of the current left top vertex and the current right top vertex and transferring information defining a first trapezoid bounded by the current left top vertex, the current right top vertex, the current bottom height, the first slope, and second slope from the data processing system to the graphics accelerator chip across the digital data bus, wherein the graphics accelerator chip draws the first trapezoid;

(6) if the left bottom vertex is at a greater height than the right bottom vertex, setting the current bottom height equal to the height of the left bottom vertex and transferring information defining a second trapezoid bounded by the current left top vertex, the current right top vertex, the current bottom height, the first slope, and second slope from the data processing system to the graphics accelerator chip across the digital data bus, wherein the graphics accelerator chip draws the second trapezoid;

(7) if the right bottom vertex is at a greater height than the left bottom vertex, setting the current bottom height equal to the height of the right bottom vertex and transferring information defining a third trapezoid bounded by the current left top vertex, the current right top vertex, the current bottom height, the first slope, and second slope from the data processing system to the graphics accelerator chip across the digital data bus, wherein the graphics accelerator chip draws the third trapezoid; and (8) if there is a vertex below the current bottom height, setting the height of the current left top vertex and current right top vertex equal to the current bottom height and returning to step (3);

wherein the convex polygon is completely drawn by the graphics accelerator chip drawing a combination of the trapezoids.

25. A method for sending instructions to a graphics accelerator chip using a programmable data processing system having a data input device and a digital data bus capable of transmitting address information and data information, the method comprising the steps of:

(a) using the data input device to provide the programmable data processing system with input information representing a chip instruction;

(b) using the programmable data processing system to perform the steps of:

(1) separating the input information into an address portion and a data portion;

(2) combining the address portion and the data portion into a single instruction which is formatted to be read by the chip, the single instruction selected from the group consisting of CHIP_ID, having offset 0x1E00, MODE, having offset 0x1E04, HESYNC/HEBLNK, having offset 0x1E08, HSBLNK/HTOTAL, having offset 0x1E0C, VESYNC/VEBLNK, having offset 0x1E10, VSBLNK/VTOTAL, having offset 0x1E14, VIDCTRL, having offset 0x1E18, VERTICAL_INTERRUPT, having offset 0x1E1A, DPYBASE, having offset 0x1E1C, FBUFBASE1, having offset 0x1E20, FBUFBASE2, having offset 0x1E24, PZBUFBASE, having offset 0x1E28, ZBUFBASE2, having offset 0x1E2C, MBUFBASE, having offset 0x1E30, DPYPITCH, having offset 0x1E34,
MBPITCH, having offset 0x1E36,
FBPITCH1/FBPITCH2, having offset 0x1E38,
ZBPITCH1/ZBPITCH2, having offset 0x1E3C,
PRIMITIVE, having offset 0x1E42,
FONT HEIGHT/FONT_WIDTH, having offset 0x1E44,
DRIVER_SIGNATURE, having offset 0x1E47,
LROP, having offset 0x1E48,
AROP, having offset 0x1E49,
STYLELEN, having offset 0x1E4A,
CPATHEIGHT/CPATWIDTH, having offset 0x1E4B,
STYLE, having offset 0x1E4C,
ZCLIP, having offset 0x1E50,
WZOFFSET, having offset 0x1E52,
WZOFFSET, having offset 0x1E52,
WYOFFSET/WXOFFSET, having offset 0x1E54,
WYOFFSET/WXOFFSET, having offset 0x1E54,
WYOFFSET/WXOFFSET, having offset 0x1E54,
CTOP/CLEFT, having offset 0x1E58,
CBOTTOM/CRIGHT, having offset 0x1E5C,
Y0/X0, having offset 0x1E60,
Y1/X1, having offset 0x1E64,
Y2/X2, having offset 0x1E68,
Y3/X3, having offset 0x1E6C,
FCOLOR, having offset 0x1E70,
BCOLOR, having offset 0x1E74,
MONOCHROME PATTERN, having offset 0x1E78,
FX0, having offset 0x1E80,
dFX0, having offset 0x1E84,
FX1, having offset 0x1E88,
dFX1, having offset 0x1E8C,
HZ, having offset 0x1E90,
dHZ, having offset 0x1E94,
VZ, having offset 0x1E98,
dVZ, having offset 0x1E9C,
HR, having offset 0x1EA0,
dHR, having offset 0x1EA4,
VR, having offset 0x1EA8,
dVR, having offset 0x1EAC,
HG, having offset 0x1EB0,
dHG, having offset 0x1EB4,
VG, having offset 0x1EB8,
dVG, having offset 0x1EBC,
HB, having offset 0x1EC0,
dHB, having offset 0x1EC4,
VB, having offset 0x1EC8,
dVB, having offset 0x1ECC,
AXIAL_STEP, having offset 0x1EF0,
DIAG STEP, having offset 0x1EF4,
INITIAL_ERR, having offset 0x1EF8,
DIR/COUNT, having offset 0x1EFC,
FIFO_WRITE, having offset 0x1F00—1F7F,
RESULT_READ, having offset 0x1F00—1F7F,
POWERUP, having offset 0x1F80,
MAP0, having offset 0x1F84,
MAP1, having offset 0x1F88,
FIFO_PRIMITIVE, having offset 0x1F8E,
STATUS, having offset 0x1F90,
CONTROL, having offset 0x1F92,
INTERRUPT_STATUS, having offset 0x1F94, and
INTERRUPT_ENABLE, having offset 0x1F96;

(3) sending the formatted chip instruction to the graphics accelerator chip using the digital data bus;

wherein the graphics accelerator chip receives the formatted chip instruction from the digital data bus and performs the operation designated by the formatted chip instruction.

26. A method of performing multiple graphics operations with a graphics accelerator chip using a programmable data processing system having a data input device and a digital data bus capable of transferring information between the data processing system and the graphics accelerator chip, the graphics accelerator chip having a buffer memory and a temporary memory for storing a primitive command, the method comprising the steps of:

(a) transferring the primitive command from the data processing system to the graphics accelerator chip across the digital data bus into the temporary memory;

(b) transferring multiple data parameters corresponding to one of the multiple graphics operations from the data processing system to the graphics accelerator chip across the digital data bus into the buffer memory; (c) using the graphics accelerator chip to perform a graphics operation corresponding to the primitive command stored in the temporary memory and the multiple data parameters stored in the buffer memory; and (d) returning to step (b) if there are ones of the multiple data parameters which have not been transferred from the data processing system to the graphics accelerator chip;

wherein the primitive command is transferred from the data processing system to the graphics accelerator chip only once during the performance of the multiple graphics operations.

27. A method of performing a draw string operation with a graphics accelerator chip which interprets graphics instructions and data received via an external data bus, the graphics accelerator chip being logically coupled to a display memory initialized with a rectangular array of bitmap cells addressable by cell row and cell column, the graphics accelerator chip having a buffer memory for storing multiple data parameters and a temporary memory logically coupled to the external data bus for temporarily storing a draw string graphics command, wherein the graphics accelerator chip receives a cell column value, a cell row value, and a cell width value from the external data bus into the buffer memory; and the graphics accelerator chip transfers pixel signals representative of a portion of a display image from a cell in the display memory corresponding to the cell column value and cell row value stored in buffer memory to a destination location in the display memory, and moves the destination location to a next display location by the value of the cell width value; and the draw string graphics command is transferred to the temporary memory only once during the performance of the draw string operation.

28. A method of performing a draw string operation with a graphics accelerator chip using a programmable data processing system having a digital data bus capable of transferring information between the data processing system and the graphics accelerator chip, and a display memory initialized with a rectangular array of bitmap cells addressable by cell row and cell column, the graphics accelerator chip having a buffer memory for storing multiple data parameters and a temporary memory for storing a primitive command, the method comprising the steps of:

(a) transferring a draw string primitive command from the data processing system to the graphics accelerator chip across the digital data bus into the temporary memory;

(b) transferring multiple data parameters from the data processing system to the graphics accelerator chip across the digital data bus into the buffer memory, the multiple data parameters including a source point, a destination point, a width value, and a height value;

(c) transferring a cell column value, a cell row value, and a cell width value from the data processing system to the graphics accelerator chip across the digital data bus into the buffer memory;

(d) using the graphics accelerator chip to transfer pixel signals representative of a portion of a display image from a cell in the display memory corresponding to the cell column value and cell row value stored in buffer memory to a destination location in the display memory, and moving the destination location to a next display location by the value of the cell width value; and (e) returning to step (c) if there are cell column and row values which have not been transferred from the data processing system to the graphics accelerator chip;

wherein the draw string primitive command is transferred from the data processing system to the graphics accelerator chip only once during the performance of the draw string operation.

29. A graphics accelerator chip which interprets graphics instructions and data received via an external data bus, the graphics accelerator chip being logically coupled to a display memory and having a temporary memory logically coupled to the external data bus for temporarily storing a graphics instruction, wherein the graphics accelerator chip:

performs a logical exclusive-or (XOR) operation on the pixel signal representative of a portion of a display image located at a first location within the display memory to a pixel signal representative of a portion of a display image located at a second location within the display memory;

performs a logical XOR operation on the pixel signal representative of a portion of a display image located at the second location within the display memory to the pixel signal representative of a portion of a display image located at the first location within the display memory; and performs a logical XOR operation on the pixel signal representative of a portion of a display image located at the first location within the display memory to the pixel signal representative of a portion of a display image located at the second location within the display memory;

wherein the pixel signal representative of a portion of a display image located at the first location within the display memory is exchanged with the pixel signal representative of a portion of a display image located at the second location within the display memory.

* * * * *